(12) United States Patent
Kim et al.

(10) Patent No.: US 10,704,654 B2
(45) Date of Patent: Jul. 7, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 16/201,909

(22) Filed: Nov. 27, 2018

(65) Prior Publication Data

US 2020/0072321 A1    Mar. 5, 2020

(30) Foreign Application Priority Data

Aug. 28, 2018 (KR) .................. 10-2018-0101600

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC .............. F16H 3/66; F16H 2200/2046; F16H 2200/0069; F16H 2200/2033–2200/2061; F16H 2200/2017; F16H 2200/2015–2017; F16H 2200/006–0078
See application file for complete search history.

(56) References Cited

U.S. PATENT DOCUMENTS

| 9,394,975 | B1 | 7/2016 | Calvert et al. |
| 9,644,724 | B2 | 5/2017 | Schoolcraft |
| 9,958,039 | B1* | 5/2018 | Kim ......................... F16H 3/66 |
| 2014/0038766 | A1* | 2/2014 | Koch ...................... F16H 3/66 475/276 |
| 2016/0169351 | A1* | 6/2016 | Lee ........................ F16H 3/666 475/275 |

(Continued)

FOREIGN PATENT DOCUMENTS

| JP | 2005-172123 A | 6/2005 |
| KR | 10-2017-0108440 A | 9/2017 |

*Primary Examiner* — David R Morris
*Assistant Examiner* — Lillian T Nguyen
(74) *Attorney, Agent, or Firm* — Morgan, Lewis & Bockius LLP

(57) ABSTRACT

An automatic transmission for a vehicle, may include an input shaft receiving power; an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; and first to ninth shafts connecting the rotation elements of the first planetary gear set to the fifth planetary gear set.

17 Claims, 1 Drawing Sheet

(56) References Cited

U.S. PATENT DOCUMENTS

2017/0219061 A1\* 8/2017 Lee .......................... F16H 3/66
2018/0328468 A1\* 11/2018 Kim ......................... F16H 3/66
2018/0328469 A1\* 11/2018 Kim ......................... F16H 3/66
2019/0390743 A1\* 12/2019 Kim ......................... F16H 3/66

\* cited by examiner

| Gear stage | Coupling element | | | | | | Gear ratio | Step ratio |
|---|---|---|---|---|---|---|---|---|
| | CL1 | CL2 | CL3 | B1 | B2 | B3 | | |
| 1th | | | ● | ● | | ● | 5.309 | – |
| 2th | | | ● | | ● | ● | 3.450 | 1.539 |
| 3th | | ● | | | ● | ● | 2.590 | 1.332 |
| 4th | | ● | ● | | | ● | 1.973 | 1.313 |
| 5th | ● | ● | | | | ● | 1.689 | 1.168 |
| 6th | ● | | ● | | | ● | 1.294 | 1.305 |
| 7th | ● | ● | ● | | | | 1.000 | 1.294 |
| 8th | ● | | ● | | ● | | 0.844 | 1.185 |
| 9th | ● | ● | | | ● | | 0.633 | 1.333 |
| 10th | ● | ● | | ● | | | 0.558 | 1.134 |
| REV | ● | | | ● | | ● | −3.770 | – |

…

PLANETARY GEAR TRAIN OF AUTOMATIC TRANSMISSION FOR VEHICLE

CROSS REFERENCE TO RELATED APPLICATION

The present application claims priority to Korean Patent Application No. 10-2018-0101600, filed Aug. 28, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

A multi-stage transmission enhances fuel efficiency of a vehicle by facilitating an engine to operate in a more efficient region over the entire travel region of the vehicle, and is directed to improve the drivability of the vehicle by providing a gear ratio which is more suitable for the driver's request.

Thus, to achieve an effect of the multi-stage transmission properly, a gear ratio span, which is the total transmission ratio range which may be provided by the transmission, may be increased, a step ratio, which is the difference between a gear stage and an adjacent gear stage, may be properly ensured, and the step ratio may be changed as linearly as possible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, in which ten forward and one reverse speeds are provided, and a wide gear ratio span, a step ratio above a predetermined level, and linearity of the step ratio are ensured while the torque to be handled by components is low, whereby it is possible to ensure sufficient durability.

In various aspects of the present invention, according to some aspect of the present invention, there is provided a planetary gear train of an automatic transmission for a vehicle, the planetary gear train including: an input shaft receiving power; an output shaft outputting power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft connected to both the second rotation element and the input shaft; a second shaft connected to the fourteenth rotation element and the output shaft; a third shaft connected to the first rotation element and the thirteenth rotation element; a fourth shaft connected to the third rotation element and the fifth rotation element; a fifth shaft connected to the sixth rotation element and the seventh rotation element; a sixth shaft connected to the eleventh rotation element and the fifteenth rotation element; a seventh shaft connected to the fourth rotation element and the eighth rotation element; an eighth shaft connected to the ninth rotation element and the tenth rotation element; and a ninth shaft connected to the twelfth rotation element.

The planetary gear train may further include six coupling elements selectively connecting shafts of the first to the ninth shafts or selectively connecting a shaft and a transmission housing, wherein, of the six coupling elements, three coupling elements are controlled to be simultaneously operated, such that a predetermined gear stage of forward and reverse speeds is implemented.

The six coupling elements may include: three clutches connecting two shafts of the first to the ninth shafts together; and three brakes selectively connecting shafts of the first to the ninth shafts without being connected to the input shaft or the output shaft, with the transmission housing.

The six coupling elements may include: a first clutch provided between the second shaft and the third shaft; a second clutch provided between the first shaft and the fifth shaft; a third clutch provided between the third shaft and the fifth shaft; a first brake provided between the seventh shaft and the transmission housing; a second brake provided between the eighth shaft and the transmission housing; and a third brake provided between the ninth shaft and the transmission housing.

The first, the second, and the third rotation elements may include a first sun gear, a first planet carrier, and a first ring gear; the fourth, the fifth, and the sixth rotation elements may include a second sun gear, a second planet carrier, and a second ring gear; the seventh, the eighth, and the ninth rotation elements may include a third sun gear, a third planet carrier, and a third ring gear; the tenth, the eleventh, and the twelfth rotation elements may include a fourth sun gear, a fourth planet carrier, and a fourth ring gear; and the thirteenth, the fourteenth, and the fifteenth rotation elements may include a fifth sun gear, a fifth planet carrier, and a fifth ring gear.

The first, second, third, fourth, and fifth planetary gear sets may be disposed such that the second, the first, the third, the fourth, and the fifth planetary gear sets are sequentially disposed from respective first sides toward second sides.

In various aspects of the present invention, according to some aspect of the present invention, there is further provided a planetary gear train of an automatic transmission for a vehicle, the planetary gear train including: a first planetary gear set configured such that one rotation element of three rotation elements thereof is connected to an input shaft; a second planetary gear set configured such that one rotation element of three rotation elements thereof is continuously connected to one rotation element of the rotation elements of the first planetary gear set, and another rotation element thereof is selectively connectable to two remaining rotation elements of the first planetary gear set; a third planetary gear set configured such that one rotation element of three rotation elements thereof is continuously connected to one rotation element of the rotation elements of the second planetary gear set and is selectively connectable to two rotation elements of the first planetary gear set, and another rotation element thereof is continuously connected to another rotation element of the second planetary gear set; a fourth planetary gear set configured such that one rotation element of three rotation elements thereof is continuously connected to one rotation element of the third planetary gear set; a fifth planetary gear set configured such that one rotation element of three rotation elements thereof is continuously connected to one rotation element of the fourth planetary gear set, another rotation element thereof is continuously connected to an output shaft, and one remaining rotation element thereof is continuously connected to one rotation element of the first planetary gear set; a first brake provided to constrain rotation of the rotation element of the third planetary gear set continuously connected to the rotation element of the second planetary gear set; a second brake provided to constrain rotation of the rotation element of the fourth planetary gear set continuously connected to the rotation element of the third planetary gear set; a third brake provided to constrain rotation of one remaining rotation element of the fourth planetary gear set without being connected to a different rotation element; a first clutch provided to selectively connect two rotation elements of the fifth planetary gear set; and a second clutch and a third clutch provided to selectively connect one rotation element of the second planetary gear set and two rotation elements of the first planetary gear set, respectively.

The rotation element of the first planetary gear set connected to the input shaft may be a second rotation element; a second rotation element of the second planetary gear set may be continuously connected to a third rotation element of the first planetary gear set, and a third rotation element of the second planetary gear set may be selectively connectable to a first rotation element and the second rotation element of the first planetary gear set, respectively; a first rotation element of the third planetary gear set may be continuously connected to the third rotation element of the second planetary gear set and may be selectively connectable to the first rotation element or the second rotation element of the first planetary gear set, respectively, and a second rotation element of the third planetary gear set may be continuously connected to a first rotation element of the second planetary gear set; a first rotation element of the fourth planetary gear set may be continuously connected to a third rotation element of the third planetary gear set; and a third rotation element of the fifth planetary gear set may be continuously connected to a second rotation element of the fourth planetary gear set, a second rotation element of the fifth planetary gear set may be continuously connected to the output shaft, and a first rotation element of the fifth planetary gear set may be continuously connected to the first rotation element of the first planetary gear set.

Of the first planetary gear set, the first rotation element may be a first sun gear, the second rotation element may be a first planet carrier, and the third rotation element may be a first ring gear; of the second planetary gear set, the first rotation element may be a second sun gear, the second rotation element may be a second planet carrier, and the third rotation element may be a third ring gear; of the third planetary gear set, the first rotation element may be a third sun gear, the second rotation element may be a third planet carrier, and the third rotation element may be a third ring gear; of the fourth planetary gear set, the first rotation element may be a fourth sun gear, the second rotation element may be a fourth planet carrier, and the third rotation element may be a fourth ring gear; and of the fifth planetary gear set, the first rotation element may be a fifth sun gear, the second rotation element may be a fifth planet carrier, and the third rotation element may be a fifth ring gear.

The first brake may be provided to constrain rotation of the second sun gear of the second planetary gear set and the third planet carrier of the third planetary gear set; the second brake may be provided to constrain rotation of the third ring gear of the third planetary gear set; and the third brake may be provided to constrain rotation of the fourth ring gear of the fourth planetary gear set.

The first clutch may be provided to selectively connect the fifth sun gear and the fifth planet carrier of the fifth planetary gear set; the second clutch may be provided to selectively connect the first planet carrier of the first planetary gear set and the second ring gear of the second planetary gear set; and the third clutch may be provided to selectively connect the first sun gear of the first planetary gear set and the second ring gear of the second planetary gear set.

The input shaft and the output shaft may be disposed concentrically with each other, and the first, second, third, fourth, and fifth planetary gear sets may be disposed such that the second, the first, the third, the fourth, and the fifth planetary gear sets are sequentially disposed along a direction from the input shaft toward the output shaft In various aspects of the present invention, according to some aspect of the present invention, there is further provided a planetary gear train of an automatic transmission for a vehicle, the planetary gear train including: a first planetary gear set, a second planetary gear set, a third planetary gear set, a fourth planetary gear set, and a fifth planetary gear set provided with respective three rotation elements; six coupling elements configured to variably provide a frictional force; and nine shafts connected to the rotation elements of the planetary gear sets, wherein, of the nine shafts, a first shaft is directly connected to a first rotation element of the first planetary gear set and an input shaft; a second shaft is directly connected to a second rotation element of the fifth planetary gear set and an output shaft; a third shaft is directly connected to a first rotation element of the first planetary gear set and a first rotation element of the fifth planetary gear set; a fourth shaft is directly connected to a third rotation element of the first planetary gear set and a second rotation element of the second planetary gear set; a fifth shaft is directly connected to a third rotation element of the second planetary gear set and a first rotation element of the third planetary gear set; a sixth shaft is directly connected to a second rotation element of the fourth planetary gear set and a third rotation element of the fifth planetary gear set; and remaining three shafts are fixedly provided in a transmission housing.

The three shafts fixedly provided in the transmission housing may include a seventh shaft, an eighth shaft, and a ninth shaft, wherein the seventh shaft is directly connected to a first rotation element of the second planetary gear set and a second rotation element of the third planetary gear set; the eighth shaft is directly connected to a third rotation element of the third planetary gear set and a first rotation element of the fourth planetary gear set; and the ninth shaft is directly connected to a third rotation element of the fourth planetary gear set.

Of the six coupling elements, a first clutch may be provided between the second shaft and the third shaft; a second clutch may be provided between the first shaft and the fifth shaft; a third clutch may be provided between the third shaft and the fifth shaft; a first brake may be provided between the seventh shaft and the transmission housing; a second brake may be provided between the eighth shaft and the transmission housing; and a third brake may be provided between the ninth shaft and the transmission housing.

The first, second, third, fourth, and fifth planetary gear sets may be disposed such that the second, the first, the third, the fourth, and the fifth planetary gear sets are sequentially disposed along an axial direction of the input shaft and the output shaft.

The rotation elements of each of the first planetary gear set to the fifth planetary gear set may be disposed such that the first rotation element, the second rotation element, and the third rotation element are sequentially disposed radially outwardly from a rotation center.

According to the planetary gear train of an automatic transmission for a vehicle configured as described above, it is advantageous in that ten forward and one reverse speeds are provided, and the gear ratio span reaches 9.5, so that the engine may be driven mainly in a more efficient region, whereby the fuel efficiency of the vehicle may be improved.

The present invention is further advantageous in that a minimum step ratio is 1.134 or more, and the change in the step ratio according to changing gear is linear, whereby the driving performance of the vehicle may be maximized by improving the vehicle acceleration before and after the shift, and the rhythm of the engine speed.

The present invention is further advantageous in that a wide gear ratio span, a step ratio above a predetermined level, and linearity of the step ratio are ensured while the torque to be handled by components is low, whereby it is possible to ensure sufficient durability.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
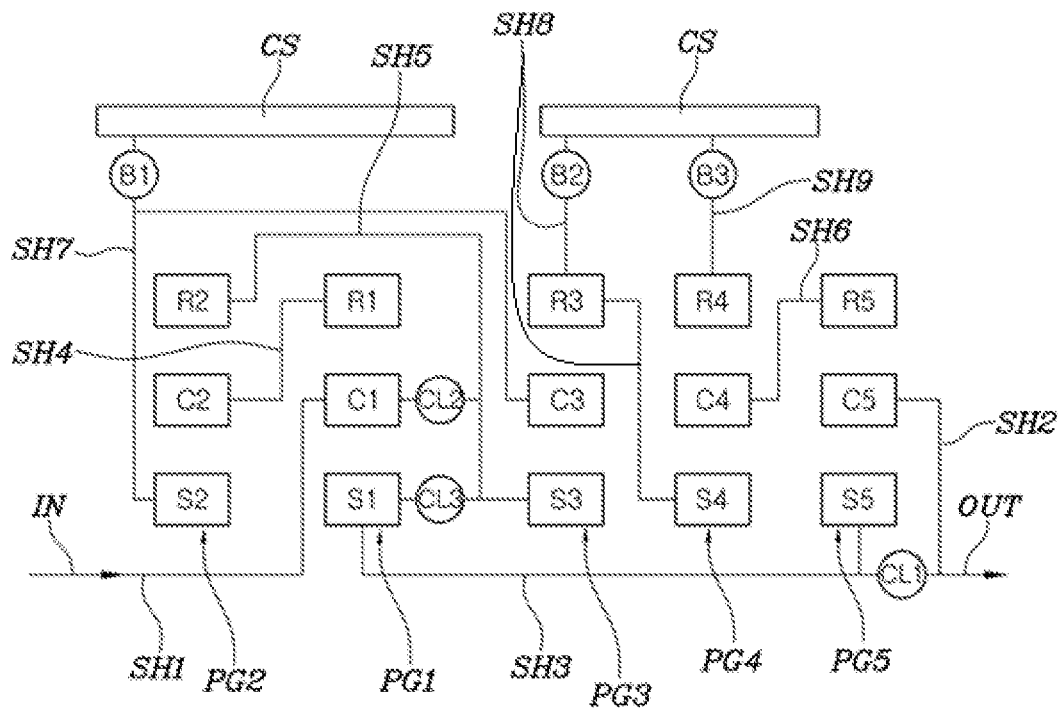
FIG. 1 is a view showing a planetary gear train of an automatic transmission for a vehicle according to an exemplary embodiment of the present invention.
FIG. 2 is an operation mode table of the planetary gear train of FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, a multi-stage transmission for a vehicle according to an exemplary embodiment of the present invention will be described in detail with reference to the accompanying drawings.

Referring to FIG. 1, a planetary gear train of an automatic transmission for a vehicle of the present invention includes: an input shaft IN receiving power from a power source such as an engine; an output shaft OUT outputting power; a first planetary gear set PG1 having first, second, third rotation elements; a second planetary gear set PG2 having fourth, fifth, sixth rotation elements; a third planetary gear set PG3 having seventh, eighth, ninth rotation elements; a fourth planetary gear set PG4 having tenth, eleventh, twelfth rotation elements; and a fifth planetary gear set PG5 having thirteenth, fourteenth, fifteenth rotation elements.

The planetary gear train includes: a first shaft SH1 connected to both the second rotation element and the input shaft IN; a second shaft SH2 connected to both the fourteenth rotation element and the output shaft OUT; a third shaft SH3 connected to the first rotation element and the thirteenth rotation element; a fourth shaft SH4 connected to the third rotation element and the fifth rotation element; a fifth shaft SH5 connected to the sixth rotation element and the seventh rotation element; a sixth shaft SH6 connected to the eleventh rotation element and the fifteenth rotation element; a seventh shaft SH7 connected to the fourth rotation element and the eighth rotation element; an eighth shaft SH8 connected to the ninth rotation element and the tenth rotation element; and a ninth shaft SH9 connected to the twelfth rotation element.

The first, second, third, fourth, fifth planetary gear sets are disposed such that the second planetary gear set PG2, the first planetary gear set PG1, the third planetary gear set PG3, the fourth planetary gear set PG4, and the fifth planetary gear set PG5 are sequentially disposed from respective first sides toward second sides.

In other words, a power source such as an engine may supply power through the input shaft IN and first shaft SH1, and after the supplied power is appropriately shifted through the configuration of the present invention, in which the second planetary gear set PG2, the first planetary gear set PG1, the third planetary gear set PG3, the fourth planetary gear set PG4, and the fifth planetary gear set PG5 are sequentially disposed, then the power is output to the output shaft OUT via the fourteenth rotation element of the fifth planetary gear set PG5 and the second shaft SH2.

Each of the second planetary gear set PG2, the first planetary gear set PG1, the third planetary gear set PG3, the fourth planetary gear set PG4, and the fifth planetary gear set PG5 forming the planetary gear train is a single pinion planetary gear set having three rotation elements.

The planetary gear train is mounted in a transmission housing CS, wherein a torque converter may be provided between the power source such as an engine and the input shaft IN and the power output to the output shaft OUT may be supplied to the drive wheel of the vehicle through a differential which is not shown.

The planetary gear train further includes six coupling elements selectively connecting shafts of the first shaft SH1 to the ninth shaft SH9 or selectively connecting a shaft and the transmission housing CS, wherein of the six coupling elements, three coupling elements are controlled to be simultaneously engaged with each other, such that a forward or reverse speed is implemented.

In other words, in implementing one of first to tenth forward gear stages and R-gear as a reverse speed as shown in FIG. 2, three predetermined coupling elements of the six coupling elements are engaged with each other such that the corresponding gear stage is implemented.

Of course, when shifting from one stage to a neighboring stage of the gear stages, a clutch-to-clutch shifting, in which shifting is performed by engaging one coupling element in the target gear stage while releasing another coupling element in the present gear stage of the respective three coupling elements required for implementing each gear stage, is possible.

The six coupling elements include three clutches connecting two shafts of the first shaft SH1 to the ninth shaft SH9 together, and three brakes selectively connecting shafts of the first shaft SH1 to the ninth shaft SH9 without being connected to the input shaft IN or the output shaft OUT, with the transmission housing CS.

Referring to FIG. 1, the six coupling elements include: a first clutch CL1 provided between the second shaft SH2 and the third shaft SH3; a second clutch CL2 provided between the first shaft SH1 and the fifth shaft SH5; a third clutch CL3 provided between the third shaft SH3 and the fifth shaft SH5; a first brake B1 provided between the seventh shaft SH7 and the transmission housing CS; a second brake B2 provided between the eighth shaft SH8 and the transmission housing CS; and a third brake B3 provided between the ninth shaft SH9 and the transmission housing CS.

The first, the second, and the third rotation elements include a first sun gear S1, a first planet carrier C1, and a first ring gear R1; the fourth, the fifth, and the sixth rotation elements include a second sun gear S2, a second planet carrier C2, and a second ring gear R2; the seventh, the eighth, and the ninth rotation elements include a third sun gear S3, a third planet carrier C3, and a third ring gear R3; the tenth, the eleventh, and the twelfth rotation elements include a fourth sun gear S4, a fourth planet carrier C4, and a fourth ring gear R4; and the thirteenth, the fourteenth, and the fifteenth rotation elements include a fifth sun gear S5, a fifth planet carrier C5, and a fifth ring gear R5.

Furthermore, the planetary gear train of an automatic transmission for a vehicle according to an exemplary embodiment of the present invention shown in FIG. 1 may be expressed as follows.

In other words, the planetary gear train of an automatic transmission for a vehicle according to an exemplary embodiment of the present invention may include the first planetary gear set PG1 configured such that one rotation element of three rotation elements thereof is connected to the input shaft IN; the second planetary gear set PG2 configured such that one rotation element of three rotation elements thereof is continuously connected to one rotation element of the rotation elements of the first planetary gear set PG1, and another rotation element thereof is selectively connectable to two remaining rotation elements of the first planetary gear set PG1; a third planetary gear set PG3 configured such that one rotation element of three rotation elements thereof is continuously connected to one rotation element of the rotation elements of the second planetary gear set PG2 and is selectively connectable to two rotation elements of the first planetary gear set PG1, and another rotation element thereof is continuously connected to another rotation element of the second planetary gear set PG2; a fourth planetary gear set PG4 configured such that one rotation element of three rotation elements thereof is continuously connected to one rotation element of the third planetary gear set PG3; a fifth planetary gear set PG5 configured such that one rotation element of three rotation elements thereof is continuously connected to one rotation element of the fourth planetary gear set PG4, another rotation element thereof is continuously connected to the output shaft, and one remaining rotation element thereof is continuously connected to one rotation element of the first planetary gear set PG1; a first brake B1 provided to constrain rotation of the rotation element of the third planetary gear set PG3 continuously connected to the rotation element of the second planetary gear set PG2; a second brake B2 provided to constrain rotation of the rotation element of the fourth planetary gear set PG4 continuously connected to the rotation element of the third planetary gear set PG3; a third brake B3 provided to constrain rotation of one remaining rotation element of the fourth planetary gear set PG4 without being connected to a different rotation element; a first clutch CL1 provided to selectively connect two rotation elements of the fifth planetary gear set PG5; and a second clutch CL2 and a third clutch CL3 provided to selectively connect one rotation element of the second planetary gear set PG2 and two rotation elements of the first planetary gear set PG1, respectively.

The rotation element of the first planetary gear set PG1 connected to the input shaft IN is the second rotation element, the second rotation element of the second planetary gear set PG2 is continuously connected to the third rotation element of the first planetary gear set PG1, and the third rotation element of the second planetary gear set PG2 is selectively connectable to the first rotation element or the second rotation element of the first planetary gear set PG1, respectively.

The first rotation element of the third planetary gear set PG3 is continuously connected to the third rotation element of the second planetary gear set PG2 and is selectively connectable to the first rotation element or the second rotation element of the first planetary gear set PG1, respectively, and the second rotation element of the third planetary gear set PG3 is continuously connected to the first rotation element of the second planetary gear set PG2.

The first rotation element of the fourth planetary gear set PG4 is continuously connected to the third rotation element of the third planetary gear set PG3, the third rotation element of the fifth planetary gear set PG5 is continuously connected to the second rotation element of the fourth planetary gear set PG4, the second rotation element of the fifth planetary gear set is continuously connected to the output shaft OUT, and the first rotation element of the fifth planetary gear set is continuously connected to the first rotation element of the first planetary gear set PG1.

The first brake B1 is provided to constrain rotation of the second sun gear S2 of the second planetary gear set PG2 and the third planet carrier C3 of the third planetary gear set PG3, the second brake B2 is provided to constrain rotation of the third ring gear R3 of the third planetary gear set PG3, and the third brake B3 is provided to constrain rotation of the fourth ring gear R4 of the fourth planetary gear set PG4.

The first clutch CL1 is provided to selectively connect the fifth sun gear S5 and the fifth planet carrier C5 of the fifth planetary gear set PG5; the second clutch CL2 is provided to selectively connect the first planet carrier C1 of the first planetary gear set PG1 and the second ring gear R2 of the second planetary gear set PG2; and the third clutch CL3 is provided to selectively connect the first sun gear S1 of the first planetary gear set PG1 and the second ring gear R2 of the second planetary gear set PG2.

Furthermore, the planetary gear train of an automatic transmission for a vehicle according to an exemplary embodiment of the present invention shown in FIG. 1 may be expressed as follows.

In other words, the planetary gear train of an automatic transmission for a vehicle according to an exemplary embodiment of the present invention may include the first planetary gear set PG1, the second planetary gear set PG2, the third planetary gear set PG3, the fourth planetary gear set PG4, and the fifth planetary gear set PG5 provided with respective three rotation elements; six coupling elements configured to variably provide a frictional force; and nine shafts connected to the rotation elements of the planetary gear sets.

Herein, the first shaft SH1 is directly connected to the second rotation element of the first planetary gear set PG1 and the input shaft IN; the second shaft SH2 is directly connected to the second rotation element of the fifth planetary gear set PG5 and the output shaft OUT; the third shaft SH3 is directly connected to the first rotation element of the first planetary gear set PG1 and the first rotation element of the fifth planetary gear set PG5; the fourth shaft SH4 is directly connected to the third rotation element of the first planetary gear set PG1 and the second rotation element of the second planetary gear set PG2; the fifth shaft SH5 is directly connected to the third rotation element of the second planetary gear set PG2 and the first rotation element of the third planetary gear set PG3; the sixth shaft SH6 is directly connected to the second rotation element of the fourth planetary gear set PG4 and the third rotation element of the fifth planetary gear set PG5; the seventh shaft SH7 is directly connected to the first rotation element of the second planetary gear set PG2 and the second rotation element of the third planetary gear set PG3; the eighth shaft SH8 is directly connected to the third rotation element of the third planetary gear set PG3 and the first rotation element of the fourth planetary gear set PG4; and the ninth shaft SH9 is directly connected to the third rotation element of the fourth planetary gear set PG4.

Of the six coupling elements, the first clutch CL1 is provided between the second shaft SH2 and the third shaft SH3; the second clutch CL2 is provided between the first shaft SH1 and the fifth shaft SH5; the third clutch CL3 is provided between the third shaft SH3 and the fifth shaft SH5; the first brake B1 is provided between the seventh shaft SH7 and the transmission housing; the second brake B2 is provided between the eighth shaft SH8 and the transmission housing; and the third brake B3 is provided between the ninth shaft SH9 and the transmission housing.

The first planetary gear set PG1 to the fifth planetary gear set PG5 are configured such that the second planetary gear set PG2, the first planetary gear set PG1, the third planetary gear set PG3, the fourth planetary gear set PG4, and the fifth planetary gear set PG5 are sequentially disposed along the axial direction of the input shaft IN and the output shaft OUT.

The rotation elements of each of the first planetary gear set PG1 to the fifth planetary gear set PG5 are disposed such that the first rotation element, the second rotation element, and the third rotation element are sequentially disposed radially outwardly from a rotation center.

The planetary gear train of an automatic transmission for a vehicle configured as described above implements gear stages according to the operation mode table of FIG. 2.

A first forward speed is implemented by engaging the third clutch CL3, the first brake B1, and the third brake B3.

Since the second sun gear S2 is locked by the first brake B1, the first ring gear R1 is integrally connected to the second planet carrier C2 by the fourth shaft SH4, the first sun gear S1 is integrally connected to the second ring gear R2 by the third clutch CL3, the power supplied to the input shaft IN is transmitted to the first planet carrier C1 of the first planetary gear set PG1 through the first shaft SH1, and the power transmitted to the first planet carrier C1 is accelerated and transmitted to the third sun gear S3 through the first sun gear S1; since the third planet carrier C3 is locked by the first brake B1, the power of the third sun gear S3 is transmitted reversely to the third ring gear R3, the rotation of the fourth sun gear S4 connected to the eighth shaft SH8 by the third ring gear R3 is decelerated by the fourth planet carrier C4 and transmitted to the fifth ring gear R5 through the sixth shaft SH6 as the fourth ring gear R4 is locked by the third brake B3; and the power of the fifth sun gear S5 connected to the first sun gear S1 and the third shaft SH3 is decelerated by the fifth planet carrier C5 while being supported by the reaction force provided when the fifth ring gear R5 is reversely rotated, and forms the first forward speed, whereby the same is output to the second shaft SH2 and the output shaft OUT.

A second forward speed is implemented by releasing the first brake B1 from the first gear state and engaging the second brake B2. The power input to the first planet carrier C1 through the input shaft IN and the first shaft SH1 is shifted while passing through the first planetary gear set PG1 to the fifth planetary gear set PG5, and is output to the second shaft SH2 while forming the second forward speed.

A third forward speed is implemented by releasing the third clutch CL3 from the second gear state and engaging the second clutch CL2. The power input to the first planet carrier C1 through the input shaft IN and the first shaft SH1 is shifted while passing through the first planetary gear set PG1 to the fifth planetary gear set PG5, and is output to the second shaft SH2 while forming the third forward speed.

A fourth forward speed is implemented by releasing the second brake B2 from the third gear state and engaging the third clutch CL3. The power input to the first planet carrier C1 through the input shaft IN and the first shaft SH1 is shifted while passing through the first planetary gear set PG1 to the fifth planetary gear set PG5, and is output to the second shaft SH2 while forming the fourth forward speed.

A fifth forward speed is implemented by releasing the third clutch CL3 from the fourth gear state and engaging the first clutch CL1. The power input to the first planet carrier C1 through the input shaft IN and the first shaft SH1 is shifted while passing through the first planetary gear set PG1 to the fifth planetary gear set PG5, and is output to the second shaft SH2 while forming the fifth forward speed.

A sixth forward speed is implemented by releasing the second clutch CL2 from the fifth gear state and engaging the third clutch CL3. The power input to the first planet carrier C1 through the input shaft IN and the first shaft SH1 is shifted while passing through the first planetary gear set PG1 to the fifth planetary gear set PG5, and is output to the second shaft SH2 while forming the sixth forward speed.

A seventh forward speed is implemented by releasing the third brake B3 from the sixth gear state and engaging the second clutch CL2. The power input to the first planet carrier C1 through the input shaft IN and the first shaft SH1 forms the seventh forward speed while forming a 1:1 gear ratio and is output to the output shaft OUT through the second shaft SH2 7 since the first planetary gear set PG1 is integrated by the second clutch CL2 and the third clutch CL3, the fifth planetary gear set PG5 is integrated by the first clutch CL1, and the first sun gear S1 and the fifth sun gear S5 are continuously connected to each other by the third shaft SH3.

An eighth forward speed is implemented by releasing the second clutch CL2 from the seventh gear state and engaging the second brake B2. The power input to the first planet carrier C1 through the input shaft IN and the first shaft SH1 is shifted while passing through the first planetary gear set PG1 to the fifth planetary gear set PG5, and is output to the second shaft SH2 while forming the eighth forward speed.

A ninth forward speed is implemented by releasing the third clutch CL3 from the eighth gear state and engaging the second clutch CL2. The power input to the first planet carrier C1 through the input shaft IN and the first shaft SH1 is shifted while passing through the first planetary gear set PG1 to the fifth planetary gear set PG5, and is output to the second shaft SH2 while forming the ninth forward speed.

A tenth forward speed is implemented by releasing the second brake B2 from the ninth gear state and engaging the first brake B1. The power input to the first planet carrier C1 through the input shaft IN and the first shaft SH1 is shifted while passing through the first planetary gear set PG1 to the fifth planetary gear set PG5, and is output to the second shaft SH2 while forming the tenth forward speed.

An R-gear, which is a reverse speed, is implemented by engaging the first clutch CL1, the first brake B1, and the third brake B3. The power input to the first planet carrier C1 through the input shaft IN and the first shaft SH1 is shifted while passing through the first planetary gear set PG1 to the fifth planetary gear set PG5, and is output to the second shaft SH2 while forming the reverse speed.

As described above, according to the planetary gear train of an automatic transmission for a vehicle of the present invention, ten forward and one reverse speeds are provided, and the gear ratio span reaches 9.5, so that the engine may be driven mainly in a more efficient region, whereby it is possible to improve the fuel efficiency of the vehicle.

Furthermore, according to an exemplary embodiment of the present invention, the minimum step ratio is 1.134 or more, and the linearity of the step ratio changes with the gear stage change is ensured to be similar to the tendency of the ideal step ratio change, whereby the driving performance of the vehicle may be maximized by improving the vehicle acceleration before and after the shift, and the rhythm of the engine speed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planetary gear train of an automatic transmission for a vehicle, the planetary gear train comprising:
    an input shaft receiving power;
    an output shaft outputting power;
    a first planetary gear set having a first rotation element, a second rotation element, and a third rotation element;
    a second planetary gear set having a fourth rotation element, a fifth rotation element, and a sixth rotation element;
    a third planetary gear set having a seventh rotation element, an eighth rotation element, and a ninth rotation element;
    a fourth planetary gear set having a tenth rotation element, an eleventh rotation element, and a twelfth rotation element;
    a fifth planetary gear set having a thirteenth rotation element, a fourteenth rotation element, and a fifteenth rotation element;
    a first shaft fixedly connected to the second rotation element and the input shaft;
    a second shaft fixedly connected to the fourteenth rotation element and the output shaft;
    a third shaft fixedly connected to the first rotation element and the thirteenth rotation element;
    a fourth shaft fixedly connected to the third rotation element and the fifth rotation element;
    a fifth shaft fixedly connected to the sixth rotation element and the seventh rotation element;
    a sixth shaft fixedly connected to the eleventh rotation element and the fifteenth rotation element;
    a seventh shaft fixedly connected to the fourth rotation element and the eighth rotation element;
    an eighth shaft fixedly connected to the ninth rotation element and the tenth rotation element; and
    a ninth shaft fixedly connected to the twelfth rotation element.

2. The planetary gear train of claim 1, further including six coupling elements selectively connecting first predetermined shafts among the first to the ninth shafts or selectively connecting a shaft among the first to ninth shafts and a transmission housing,
    wherein three coupling elements of the six coupling elements are controlled to be operated so that a predetermined gear stage of forward and reverse speeds is implemented.

3. The planetary gear train of claim 2, wherein the six coupling elements include:
    three clutches connecting two shafts among the first to the ninth shafts in combination; and
    three brakes selectively connecting second predetermined shafts among the first to the ninth shafts, which are not connected to the input shaft or the output shaft, with the transmission housing.

4. The planetary gear train of claim 2, wherein the six coupling elements include:
    a first clutch mounted between the second shaft and the third shaft;
    a second clutch mounted between the first shaft and the fifth shaft;
    a third clutch mounted between the third shaft and the fifth shaft;
    a first brake mounted between the seventh shaft and the transmission housing;
    a second brake mounted between the eighth shaft and the transmission housing; and
    a third brake mounted between the ninth shaft and the transmission housing.

5. The planetary gear train of claim 1,
    wherein the first rotation element, the second rotation element, and the third rotation elements include a first sun gear, a first planet carrier, and a first ring gear, respectively;
    wherein the fourth rotation element, the fifth rotation element, and the sixth rotation element include a second sun gear, a second planet carrier, and a second ring gear, respectively;

wherein the seventh rotation element, the eighth rotation element, and the ninth rotation element include a third sun gear, a third planet carrier, and a third ring gear, respectively;

wherein the tenth rotation element, the eleventh rotation element, and the twelfth rotation element include a fourth sun gear, a fourth planet carrier, and a fourth ring gear, respectively; and wherein the thirteenth rotation element, the fourteenth rotation element, and the fifteenth rotation element include a fifth sun gear, a fifth planet carrier, and a fifth ring gear, respectively.

6. The planetary gear train of claim 1, wherein the first, second, third, fourth, and fifth planetary gear sets are mounted such that the second, the first, the third, the fourth, and the fifth planetary gear sets are sequentially mounted along the input shaft and the output shaft.

7. A planetary gear train of an automatic transmission for a vehicle, the planetary gear train including:

a first planetary gear set including three rotation elements having first, second, and third rotation elements, wherein one rotation element of the three rotation elements of the first planetary gear set is connected to an input shaft;

a second planetary gear set including three rotation elements having first, second, and third rotation elements wherein one rotation element among the three rotation elements of the second planetary gear set is continuously connected to another rotation element of the three rotation elements of the first planetary gear set, and another rotation element among the three rotation elements of the second planetary gear set is selectively connectable to two rotation elements among the three rotation elements of the first planetary gear set;

a third planetary gear set including three rotation elements having first, second, and third rotation elements wherein one rotation element of the three rotation elements of the third planetary gear set is continuously connected to the another rotation element among the three rotation elements of the second planetary gear set and is selectively connectable to the two rotation elements of the first planetary gear set, and another rotation element among the three rotation elements of the third planetary gear set is continuously connected to a remaining rotation element among the three rotation elements of the second planetary gear set;

a fourth planetary gear set including three rotation elements having first, second, and third rotation elements wherein one rotation element of the three rotation elements of the first fourth planetary gear set is continuously connected to a remaining rotation element among the three rotation elements of the third planetary gear set;

a fifth planetary gear set including three rotation elements having first, second, and third rotation elements wherein one rotation element of the three rotation elements of the fifth planetary gear set is continuously connected to another rotation element among the three rotation elements of the fourth planetary gear set, another rotation element among the three rotation elements of the fifth planetary gear set is continuously connected to an output shaft, and one remaining rotation element among the three rotation elements of the fifth planetary gear set is continuously connected to a remaining rotation element of the first planetary gear set;

a first brake provided to selectively constrain rotation of the another rotation element of the third planetary gear set continuously connected to the remaining rotation element of the second planetary gear set, by connecting the another rotation element of the third planetary gear set continuously connected to the remaining rotation element of the second planetary gear set, to the transmission housing;

a second brake provided to selectively constrain rotation of one rotation element of the fourth planetary gear set continuously connected to the remaining rotation element of the third planetary gear set, by connecting the one rotation element of the fourth planetary gear set continuously connected to the remaining rotation element of the third planetary gear set to the transmission housing;

a third brake provided to selectively constrain rotation of one remaining rotation element of the fourth planetary gear set, by connecting the one remaining rotation element of the fourth planetary gear set to the transmission housing;

a first clutch provided to selectively connect two rotation elements among the three rotation elements of the fifth planetary gear set; and a second clutch and a third clutch provided to selectively connect the another rotation element among the three rotation elements of the second planetary gear set and two rotation elements among the three rotation elements of the first planetary gear set, respectively.

8. The planetary gear train of claim 7, wherein the one rotation element of the first planetary gear set connected to the input shaft is the second rotation element;

wherein the second rotation element of the second planetary gear set is continuously connected to the third rotation element of the first planetary gear set, and the third rotation element of the second planetary gear set is selectively connectable to the first rotation element or the second rotation element of the first planetary gear set, respectively;

wherein the first rotation element of the third planetary gear set is continuously connected to the third rotation element of the second planetary gear set and is selectively connectable to the first rotation element or the second rotation element of the first planetary gear set, respectively, and the second rotation element of the third planetary gear set is continuously connected to the first rotation element of the second planetary gear set;

wherein the first rotation element of the fourth planetary gear set is continuously connected to the third rotation element of the third planetary gear set; and wherein the third rotation element of the fifth planetary gear set is continuously connected to the second rotation element of the fourth planetary gear set, the second rotation element of the fifth planetary gear set is continuously connected to the output shaft, and the first rotation element of the fifth planetary gear set is continuously connected to the first rotation element of the first planetary gear set.

9. The planetary gear train of claim 8, wherein the first rotation element of the first planetary gear set is a first sun gear, the second rotation element of the first planetary gear set is a first planet carrier, and the third rotation element of the first planetary gear set is a first ring gear;

wherein the first rotation element of the second planetary gear set is a second sun gear, the second rotation element of the second planetary gear set is a second planet carrier, and the third rotation element of the second planetary gear set is a third ring gear;

wherein the first rotation element of the third planetary gear set is a third sun gear, the second rotation element of the third planetary gear set is a third planet carrier, and the third rotation element of the third planetary gear set is a third ring gear;

wherein the first rotation element of the fourth planetary gear set is a fourth sun gear, the second rotation element of the fourth planetary gear set is a fourth planet carrier, and the third rotation element of the fourth planetary gear set is a fourth ring gear; and wherein the first rotation element of the fifth planetary gear set is a fifth sun gear, the second rotation element of the fifth planetary gear set is a fifth planet carrier, and the third rotation element of the fifth planetary gear set is a fifth ring gear.

10. The planetary gear train of claim 9, wherein the first brake is provided to selectively constrain rotation of the second sun gear of the second planetary gear set and the third planet carrier of the third planetary gear set, by connecting the second sun gear of the second planetary gear set and the third planet carrier of the third planetary gear set to the transmission housing;

wherein the second brake is provided to selectively constrain rotation of the third ring gear of the third planetary gear set, by connecting the third ring gear of the third planetary gear set to the transmission housing; and wherein the third brake is provided to selectively constrain rotation of the fourth ring gear of the fourth planetary gear set, by connecting the fourth ring gear of the fourth planetary gear set to the transmission housing.

11. The planetary gear train of claim 10, wherein the first clutch is provided to selectively connect the fifth sun gear and the fifth planet carrier of the fifth planetary gear set;

wherein the second clutch is provided to selectively connect the first planet carrier of the first planetary gear set and the second ring gear of the second planetary gear set; and wherein the third clutch is provided to selectively connect the first sun gear of the first planetary gear set and the second ring gear of the second planetary gear set.

12. The planetary gear train of claim 7, wherein the input shaft and the output shaft are mounted concentrically with each other, and wherein the first, second, third, fourth, and fifth planetary gear sets are mounted such that the second, the first, the third, the fourth, and the fifth planetary gear sets are sequentially mounted along a direction from the input shaft toward the output shaft.

13. A planetary gear train of an automatic transmission for a vehicle, the planetary gear train including:

a first planetary gear set, a second planetary gear set, a third planetary gear set, a fourth planetary gear set, and a fifth planetary gear set respectively provided with three rotation elements having first, second, and third rotation elements;

six coupling elements configured to variably provide the first to fifth planetary gear sets with a frictional force; and first to ninth shafts connected to the three rotation elements of the first to fifth planetary gear sets, wherein the first shaft is fixedly connected to the second rotation element of the first planetary gear set and an input shaft;

wherein the second shaft is fixedly connected to the second rotation element of the fifth planetary gear set and an output shaft;

wherein the third shaft is fixedly connected to the first rotation element of the first planetary gear set and the first rotation element of the fifth planetary gear set;

wherein the fourth shaft is fixedly connected to the third rotation element of the first planetary gear set and the second rotation element of the second planetary gear set;

wherein the fifth shaft is fixedly connected to the third rotation element of the second planetary gear set and the first rotation element of the third planetary gear set;

wherein the sixth shaft is fixedly connected to the second rotation element of the fourth planetary gear set and the third rotation element of the fifth planetary gear set; and wherein remaining three shafts among the first to ninth shafts are selectively connectable to a transmission housing.

14. The planetary gear train of claim 13, wherein the remaining three shafts fixedly provided in the transmission housing include the seventh shaft, the eighth shaft, and the ninth shaft, wherein the seventh shaft is fixedly connected to the first rotation element of the second planetary gear set and the second rotation element of the third planetary gear set;

wherein the eighth shaft is fixedly connected to the third rotation element of the third planetary gear set and the first rotation element of the fourth planetary gear set; and wherein the ninth shaft is fixedly connected to the third rotation element of the fourth planetary gear set.

15. The planetary gear train of claim 14, wherein the six coupling elements includes a first clutch, a second clutch, a third clutch, a first brake, a second brake and a third brake;

wherein the first clutch is mounted between the second shaft and the third shaft;

wherein the second clutch is mounted between the first shaft and the fifth shaft;

wherein the third clutch is mounted between the third shaft and the fifth shaft;

wherein the first brake is mounted between the seventh shaft and the transmission housing;

wherein the second brake is mounted between the eighth shaft and the transmission housing; and wherein the third brake is mounted between the ninth shaft and the transmission housing.

16. The planetary gear train of claim 13, wherein the first, second, third, fourth, and fifth planetary gear sets are mounted such that the second, the first, the third, the fourth, and the fifth planetary gear sets are sequentially mounted along an axial direction of the input shaft and the output shaft.

17. The planetary gear train of claim 13, wherein the three rotation elements of each of the first to fifth planetary gear sets are mounted such that the first rotation element, the second rotation element, and the third rotation element are sequentially mounted radially outwardly from a rotation center of the first to fifth planetary gear trains.

* * * * *